United States Patent
Kang et al.

(10) Patent No.: US 6,642,924 B1
(45) Date of Patent: Nov. 4, 2003

(54) METHOD AND SYSTEM FOR OBTAINING VISUAL INFORMATION FROM AN IMAGE SEQUENCE USING VISUAL TUNNEL ANALYSIS

(75) Inventors: Sing Bing Kang, Redmond, WA (US); Peter-Pike J. Sloan, Bellevue, WA (US); Steven M. Seitz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 09/705,419

(22) Filed: Nov. 2, 2000

(51) Int. Cl.$^7$ .............................................. G06T 15/10

(52) U.S. Cl. ...................................................... 345/427

(58) Field of Search ................................ 345/427, 419, 345/426, 589, 420, 619; 382/154; 348/107.1, 107.2, 49, 50

(56) References Cited

U.S. PATENT DOCUMENTS

| 5,986,667 | A | * | 11/1999 | Jevans ......................... 345/619 |
| 6,009,188 | A | * | 12/1999 | Cohen et al. ................ 382/154 |
| 6,023,523 | A | * | 2/2000 | Cohen et al. ................ 382/154 |
| 6,097,394 | A | * | 8/2000 | Levoy et al. ................ 345/419 |
| 6,222,937 | B1 | * | 4/2001 | Cohen et al. ................ 382/154 |

OTHER PUBLICATIONS

E.H. Adelson and J.R. Bergen, *Computation Models of Visual Processing*, chapter, "The plenoptic function and the elements of early vision,".MIT Press, Cambridge, MA, 1991.

S. Avidan and A. Shashua, "Novel view synthesis in tensor space," in *CVPR*, pp. 1034–1040, San Juan, Puerto Rico, Jun. 1997.

S.E. Chen and L. Williams, "View interpolation for image synthesis," *Computer Graphics* (SIGGRAPH'93), pp. 279–288, Jul. 1993.

C.K. Cowan and P.D. Kovesi, "Automatic sensor placement from vision task requirements," *IEEE TPAMI*, 10(3):407–416, 1988.

S.J. Gortler, R. Grzeszczuk, R. Szeliski, and M.F. Cohen, "The lumigraph," *Computer Graphics* (SIGGRAPH'96), pp. 43–54, Aug. 1996.

G. Greger, P. Shirley, P.M. Hubbard, and D.P. Greenberg, "The irradiance volume," *IEEE Computer Graphics and Applications*, 18(2):32–43, Mar. 1998.

(List continued on next page.)

*Primary Examiner*—Mark Zimmerman
*Assistant Examiner*—Huedung X. Cao
(74) *Attorney, Agent, or Firm*—Lyon & Harr, L.L.P.; Craig S. Fischer

(57) ABSTRACT

A method and a system for obtaining visual information from an image sequence using a visual tunnel analysis are described. The present invention determines the position and orientation of rays captured in the image sequence and uses these rays to provide visual information. This visual information includes, for example, visual prediction information (whereby the extent of visibility and appearance of a virtual camera at arbitrary locations are determined) and visual planning (whereby a minimum number of images that need to be captured to visualize a desired region is determined). Generally, the visual tunnel analysis uses a subset of the plenoptic function to determine the position and orientation of every light ray passing through each point of images in the sequence. A visual tunnel associated with an input image sequence is a volume in visibility space that represents that portion of the visibility space occupied by the input image sequence. The visual tunnel is a representation of all light rays associated with the image sequence. The present invention encodes the orientation, appearance, and density of the available light rays at every point in free space.

24 Claims, 9 Drawing Sheets

OTHER PUBLICATIONS

K.N. Kutulakos and S. Seitz, "A theory of shape by space carving," in *ICCV*, pp. 307–314, Kerkyra, Greece, Sep. 1999.

K.N. Kutulakos and C.R. Dyer, "Recovering shape by purposive viewpoint adjustment," *Int. J. of Computer Vision*, 12(2):113–136, 1994.

A. Laurentini, "The visual hull concept for silhouette–based image understanding," *IEEE TPAMI*, 16(2):150–162, Feb. 1994.

M. Levoy and P. Hanrahan, "Light field rendering," *Computer Graphics (SIGGRAPH'96)*, pp. 31–42, Aug. 1996.

J. Maver and R. Bajcsy, "Occlusions as a guide for planning the next view," *IEEE TPAMI*, 15(5):417–433, May 1993.

L. McMillian and G. Bishop, "Plenoptic Modeling: an image–based rendering system," *Proceedings of SIGGRAPH'95*, pp. 39–46, Aug. 1995.

H. Schirmacher, W. Heidrich and H.P. Seidel, "Adaptive acquisition of lumigraphs from synthetic scenes," in *Eurographics*, vol. 18, pp. 151–159, Milan, Italy, Sep. 1999.

S.M. Seitz and C.R. Dyer, "View morphing," *Computer Graphics (SIGGRAPH'96)*, pp. 21–30, Aug. 1996.

H.Y. Shum and L.W. He, "Rendering with concentric mosaics," *Computer Graphics (SIGGRAPH'99)*, pp. 299–306, Aug. 1999.

P.P. Sloan and C. Hansen, "Parallel lumigraph reconstruction," in *Parallel Visualization and Graphics '99*, pp. 7–14, Oct. 1999.

W. Stuerzlinger, "Imaging all visible surfaces," in *Graphics Interface*, Milan, Italy, Sep. 1999.

R. Szeliski, "Prediction error as a quality metric for motion and stereo," in *ICCV*, vol. 2, pp. 781–788, Kerkyra, Greece, Sep. 1999.

* cited by examiner

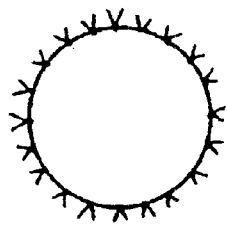 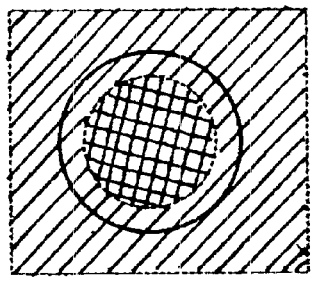
FIG. 7A
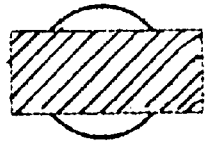 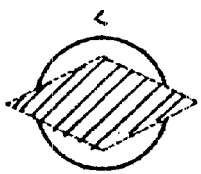 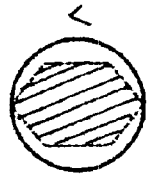
FIG. 7B  FIG. 7C  FIG. 7D
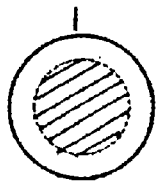 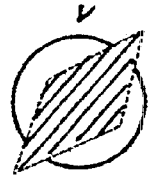 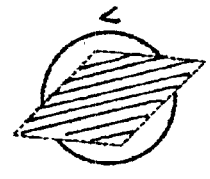
FIG. 7E  FIG. 7F  FIG. 7G
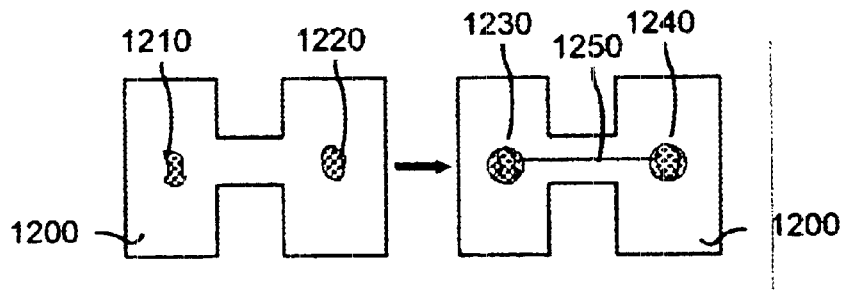
FIG. 12

METHOD AND SYSTEM FOR OBTAINING VISUAL INFORMATION FROM AN IMAGE SEQUENCE USING VISUAL TUNNEL ANALYSIS

BACKGROUND OF THE INVENTION

1. Field of the Invention

The present invention relates in general to computer imaging and more particularly to a method and a system that use a visual tunnel analysis to obtain visual information from an image sequence.

2. Related Art

One of the main objectives of computer imaging and graphics is the generation of artificial environments (or scenes). These computer-generated scenes may be entirely fictional scenes or may be images of actual scenes, but in either case the goal is to provide realistic imagery of the scene. One technique used to generate these scenes is image-based rendering, which refers to the generation of new images and views of a scene from an example image sequence (or collection of images) and views of a portion of the scene. Image-based rendering provides photorealistic rendering of a scene with less computational costs than alternate techniques such as, for example, three-dimensional (3D) modeling. Image-based rendering models a scene by taking a sequence of example images of the scene and using this example image sequence to generate other new images of the scene. These generated new images represent the scene appearance from an arbitrary viewpoint. Thus, image-based rendering provides a mechanism for simulating a continuous range of camera viewpoints (and thus a model of the entire scene) from an example image sequence of only a portion of the scene.

One technique used to generate new views is by interpolating from the example image sequence to produce new images. In particular, from any given virtual camera location, the closest example image is retrieved and an interpolation is performed on the example image to generate a new image. This technique, however, has at least two major problems. First, proper interpolation requires that an extremely large number of example images be obtained. Obtaining example images is costly and time-consuming because the time and expense required to set up cameras and lighting to obtain quality example images of a scene. Second, this technique cannot determine or predict what views the virtual camera can obtain at its present location. This means that given a virtual camera location, no information can be obtained by interpolation about which views may be visualized from that virtual camera location.

Another technique used to generate new views is by reconstruction of the plenoptic function. The plenoptic function is a five-dimensional (5D) function representing an intensity of the light observed from every position and direction in 3D space. This object of this technique is to reconstruct the plenoptic function from an example image sequence. Once the plenoptic function has been reconstructed, new images can be generated using the reconstructed function. Ray-based scene reconstruction in computer graphics using a four-dimensional (4-D) representation is discussed by Marc Levoy and Pat Hanrahan in "Light Field Rendering" and by Steven J. Gortler, Radek Grzeszczuk, Richard Szeliski and Michael F. Cohen in "The Lumigraph", the entire contents of which are hereby incorporated by reference. These papers are contained in the Proceedings of SIGGRAPH 96, Computer Graphics Proceedings, Annual Conference Series, "Light Field Rendering" (pp. 31–42) and "The Lumigraph" (pp. 43–54), August 1996, New Orleans La., Addison Wesley (Edited by Holly Rushmeier), ISBN 0-201-94800-1. One problem with using the plenoptic function is that it is a 5-D function and sampling and storing a 5D function for any useful region of space is impractical due to the computational expense and complexity involved. Thus, the techniques described in the above-referenced papers only use a 4-D representation of the plenoptic function, instead of a full 5-D representation. The simplifications and assumptions, however, that reduce the plenoptic function from a 5-D function to a 4-D function also greatly reduce the accuracy and efficiency of visual reconstruction and planning.

Using the 5-D plenoptic function as a scene representation for computer graphics was proposed by Leonard McMillan and Gary Bishop in "Plenoptic Modeling: An Image-Based Rendering System", Proceedings of SIGGRAPH 95, Computer Graphics Proceedings, Annual Conference Series, pp. 39–46, August 1995, Los Angeles, Calif., Addison Wesley (Edited by Robert Cook), ISBN 0-10201-84776-0, the entire contents of which are hereby incorporated by reference. One problem with the technique used in the paper, however, is that the paper does not propose an efficient way of capturing and representing 5-D data of this form and does not discuss any method for visual planning.

Accordingly, there exists a need for the present invention that includes a method and system for obtaining visual information from an image sequence in an efficient, inexpensive and accurate manner. In particular, the method and system of the present invention considers only the appearance of a scene and not the scene geometry. In addition, the present invention does not use interpolation and thereby alleviates the time and expense of obtaining numerous images. The present invention also uses only a portion of the plenoptic function in order to simplify computation and save computational expense. Further, the method and system of the present invention provides visual planning and predicts the views that a virtual camera can obtain at a certain location.

SUMMARY OF THE INVENTION

To overcome the limitations in the prior art as described above and other limitations that will become apparent upon reading and understanding the present specification, the present invention includes a method and system for obtaining visual information from an image sequence using a visual tunnel analysis. The present invention obtains an image sequence (or collection of images) and processes the image sequence using a visual tunnel analysis to extract visual information. In general, the visual tunnel analysis uses a subset of the plenoptic function to determine the position and orientation of every light ray passing through each point of images in the sequence. A visual tunnel, which is a volume in visibility space that represents that portion of the visibility space contained in the image sequence, is defined for the image sequence. The visual tunnel is a representation of all light rays associated with the image sequence, and the visual tunnel analysis of the present invention encodes the light rays at every point in free space and maps the light rays to a ray representation space within the visual tunnel.

The present invention obtains visual information such as visibility prediction and visibility planning information by determining all light rays passing through each image plane within the image sequence. The present invention takes advantage of the fact that in addition to capturing a discrete set of images, an image sequence also captures a continuous range of camera viewpoints. These viewpoints are defined by a collection of all light rays passing through image planes. The visual tunnel analysis of the present invention uses this relationship to obtain visual information from the image sequence. One advantage of the present invention is that, because the visual tunnel technique is concerned with scene appearance, stereo and scene geometry are not modeled and thus stereo correspondence and other expensive forms of image processing are not needed. Another advantage of the present invention is that, unlike techniques that use view interpolation between images (such as a lumigraph technique and light field rendering), the size of the image sequence does not need to be unnecessarily large. This is because the present invention provides visibility planning information to allow the planning of camera trajectories, thus reducing the number of images contained in the image sequence to those necessary to visualize the scene. The present invention also permits the characterizing of a range of new views that may be predicted from an input camera trajectory.

In general, the method of the present invention obtains visual information from an image sequence by using a visual tunnel analysis to determine a position and orientation of each light ray within the image sequence. This visual tunnel analysis includes defining a visual tunnel and mapping light rays of the image sequence to a ray space representation within the visual tunnel. Using the visual tunnel, visual information such as visibility prediction and visibility planning may be obtained. For example, a visibility prediction may be obtained as to where a scene may be visualized or a visibility plan may be obtained made as to where an input sequence of images should be captured to obtain a desired visualization of a scene. In particular, when predicting regions of visibility, the method of the present invention includes obtaining an image sequence, converting the light rays associated with the image sequence into a visual tunnel representation and extracting a region of visibility from the visual tunnel representation. The image sequence is a set of images that captures a portion of the scene appearance and the light rays associated with all the pixels in all the images of the image sequence are converted to a visual tunnel representation. This conversion is accomplished in part by updating the plenoptic function so that, for example, for each light ray, the Gaussian spheres associated with all points in space that the light ray passes record the direction of the light ray. In other words, in order to predict regions of visibility in a scene the distribution of the Gaussian sphere at a location provides the distribution of light rays available to visualize the scene.

When planning a desired visualization of a scene (also called plenoptic authoring), the method of the present invention includes obtaining an area of interest, computing maximal regions for the area of interest where sampling occurs, determining the combination of visual tunnel primitives that minimally circumscribe the area of interest, and outputting a camera trajectory that will provide the desired visualization of the scene. The present invention includes a set of visual tunnel primitives that include, for example, concentric mosaics and conic arcs. The area of interest is divided into primitives and a combination of visual tunnel primitives (such as concentric mosaics and straight paths) is assembled to minimally circumscribe the area. Dividing the area into known visual tunnel primitives that minimally circumscribe the area minimizes the number of images needed and provides an efficient camera trajectory. The present invention also includes a system for obtaining visual information from an image sequence using a visual tunnel analysis that incorporates the above-described method of the present invention.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout:

FIGS. 7A–7G illustrate a concentric mosaic and the density of its visual tunnel for several view angles.

FIG. 12 is a working example illustrating visual planning of the present invention.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Exemplary Operating Environment

Figure 1:
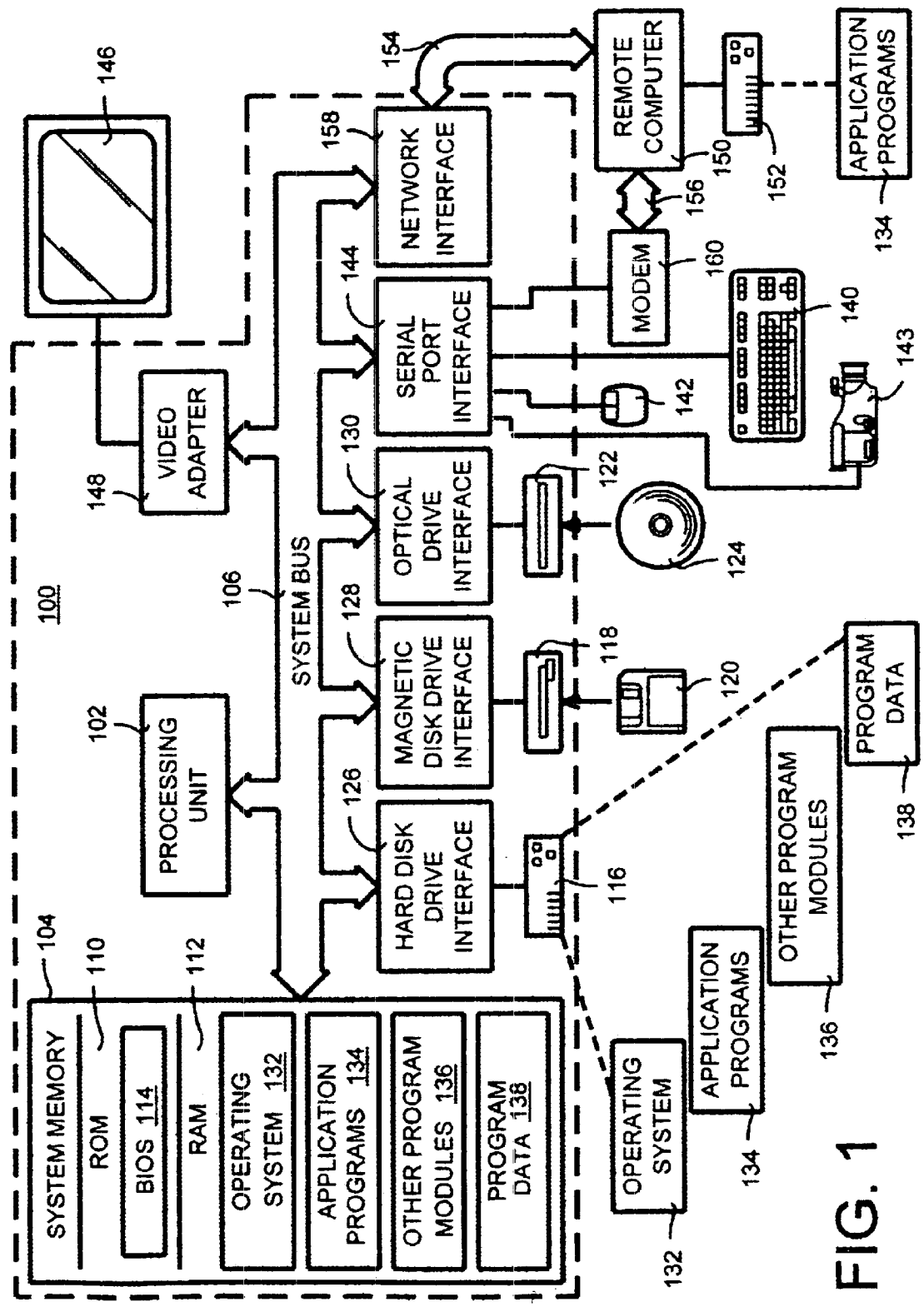
FIG. 1 is a block diagram illustrating an apparatus for carrying out the present invention.

FIG. 1 and the following discussion are intended to provide a brief, general description of a suitable computing environment in which the visual information method and system of the present invention may be implemented. Although not required, the present invention will be described in the general context of computer-executable instructions (such as program modules) being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the present invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic, routines that help to transfer information between elements within the personal computer 100, such as during start-up, is stored in ROM 110. The personal computer 100 further includes a hard disk drive 116 for reading from and writing to a hard disk (not shown), a magnetic disk drive 118 for reading from or writing to a removable magnetic disk 120, and an optical disk drive 122 for reading from or writing to a removable optical disk 124 (such as a CD-ROM or other optical media). The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142. In addition, a camera 143 (or other types of imaging devices) may be connected to the personal computer 100 as well as other input devices (not shown) including, for example, a microphone, joystick, game pad, satellite dish, scanner, or the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

II. Introduction

The present invention includes a visual information method and system for obtaining visual information from an image sequence using visual tunnel analysis. In general, the invention uses a ray representation space to determine and store visibility information. The present invention determines from a given light ray which portion of a scene is visible. Using a principled, structured approach to identifying, organizing and cataloging a collection of light rays, the present invention can provide visual information about an image sequence. The present invention uses a ray representation space that records orientations of rays passing through points in three-dimensional (3D) space. In a preferred embodiment, this ray representation space is a visual tunnel, so named because of the analogy of "carving a tunnel" in visibility space. Outside the visual tunnel there is no information available for visualization.

The present invention provides several types of visual information and answers many different visibility queries, including visual prediction information and visual planning information. Visual prediction includes both visibility and appearance prediction. Unlike prior imaging techniques that stored color information or images in ray space, the present invention also stores visibility information in ray representation space. Light rays are captured by an image sequence and used as input into the visual information system of the present invention. The position and orientation of each captured light ray is determined and mapped to a ray representation space (such as a visual tunnel). From this ray representation, visual information such as prediction and planning information can be provided. The present invention provides greater efficiency, reduces processing time (for visual prediction information), and prevents unnecessary rays from being captured (visual planning information). Unlike existing methods that merely capture a large amount of images and hope that these captured images are enough to visualize the scene, the present invention is a principled, structured approach to obtaining visual prediction and planning information.

III. General Overview

Figure 2:
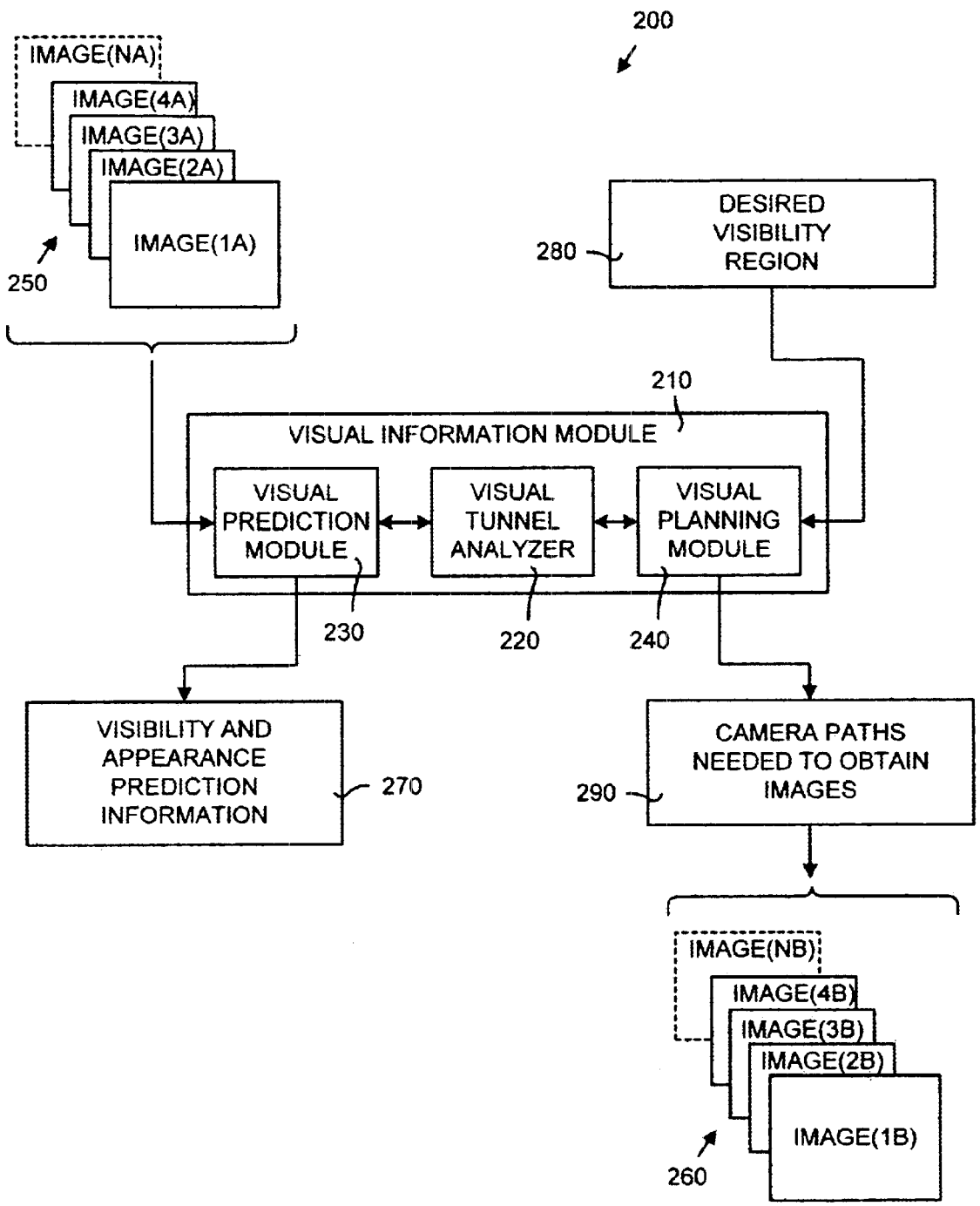
FIG. 2 is an overall block diagram of an imaging system incorporating the present invention.

The invention is embodied in a method and a system for obtaining visual information from an image sequence using visual tunnel analysis. FIG. 2 is an overall block diagram of an imaging system 200 incorporating the present invention. It should be noted that the imaging system 200 illustrated is one example of several imaging systems that may incorporate the visual information method and system of the present invention. In general, the imaging system 200 includes the visual information module 210 of the present invention, a visual prediction subsystem and a visual planning subsystem. The visual information module 210 includes a visual tunnel analyzer 220, for representing light rays within an image sequence in a ray representation space, a visual prediction module 230, for predicting available views, and a visual planning module 240, for planning a camera path to obtain a desired visibility region. As shown in FIG. 2, both the visual prediction module 230 and the visual planning module 240 are in communication with and use the visual tunnel analyzer 220.

The imaging system 200 generally includes a visual prediction subsystem and a visual planning subsystem. Depending on the application, either only one subsystem or both subsystems may be used. The visual prediction subsystem includes a first image sequence 250 containing a collection of images, image (1A) through image (NA). As described below, this first image sequence 250 is an input to the visual information module 210. The visual planning subsystem includes a second image sequence 260 containing a collection of images, image (1B) through image (NB). As also discussed below, the second image sequence 260 is output from the visual planning subsystem.

In general, the visual prediction subsystem determines views that are available from a given image sequence. Moreover, the visual prediction subsystem also determines what can be seen for a given virtual camera with a known location. Specifically, the first image sequence 250 is transmitted to the visual information module 210 and processed by the visual prediction module 230. The visual prediction module 230 uses the visual tunnel analyzer 220 to determine the available views using light ray information from the first image sequence 250. Visibility prediction (and optionally, appearance prediction) information 270 is output from the visual prediction subsystem to identify other views of a scene that are available from the first image sequence 250. In the case where a virtual camera position is given, visibility (and optionally, appearance) is predicted for that virtual camera. The visual planning subsystem generally outputs a camera path that will provide visualization of a desired visibility region. In particular, a desired visibility region 280 is selected and transmitted to the visual information module 210 where it is processed by the visual planning module 240. As discussed in detail below, this processing includes using the visual tunnel analyzer 220 to determine the camera path needed to obtain images 290 to visualize the desired visibility region 280. Once the camera path has been determined, the second images sequence 260 is obtained. The second image sequence 260 represents the minimum number of images needed to visualize the desired visibility region 280.

IV. General Operation of the Invention

Figure 3:
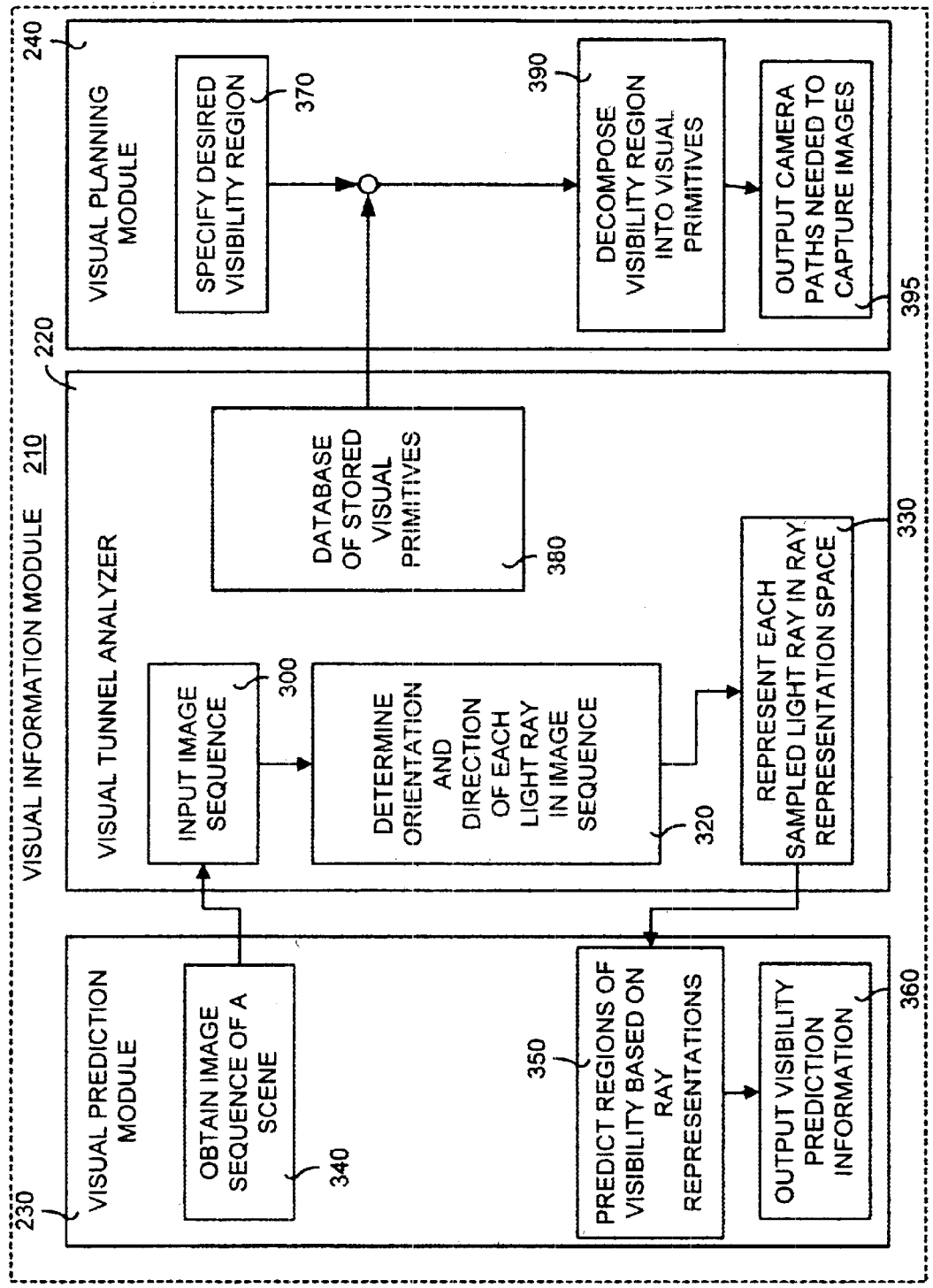
FIG. 3 is a general flow diagram illustrating the operation of the visual information module of the present invention.

FIG. 3 is a general flow diagram illustrating the operation of the visual information module 210 of the present invention. In general, the visual information module 210 obtains visual information from an image sequence using a visual tunnel analysis. This visual information includes, for example, visual prediction information that determines which views are available for a given image sequence, and visual planning information that determines camera paths needed to obtain visualization of a desired region. The visual information module 210 reduces the number of images required to provide visualization of this desired region. In addition, the visual information module 210 does not require any knowledge of scene geometry because only rays are analyzed and no scene modeling is performed. The present invention provides an efficient and useful technique to minimize the number of images needed to visualize a region and maximize the use of an existing image sequence so that all possible views available from the image sequence are found.

In particular, the visual information module 210 of the present invention inputs an image sequence (box 300) from the visual prediction module 230 or the visual planning module 240. Each image sequence provides a collection of light rays passing through all the pixels within all the images in the sequence. The visual tunnel analyzer 220 then determines position and orientation of each sampled light ray (box 320). These light rays are mapped to a ray representation space (box 330) such that each point in the representation space records the orientations of all rays passing through that point. In a preferred embodiment, a visual tunnel corresponds to the collection of non-empty points in ray representation space.

Visual prediction information can be obtained by the present invention to determine which views are available to a virtual camera. In other words, visual prediction involves determining which views (or portions of views) are defined by an arbitrary set of input images (such as an image sequence). If a virtual camera location is specifically given, then visibility and appearance information associated with that particular virtual camera can be extracted. The present invention determines visual prediction information that can be used to predict a range of visual camera poses in which a virtual view of the scene can be reconstructed entirely using light rays captured within the input image sequence. Moreover, the present invention can also predict which portions of the view of the scene can be generated for a given virtual camera pose.

The visual prediction module 230 of the present invention first obtains an image sequence of a scene (box 340). This image sequence is sent to the visual tunnel analyzer 220 and processed as discussed above. After all the sampled light rays from the image sequence are represented in ray representation space (box 330) this information is sent back to the visual prediction module 230. The visual prediction module 230 uses the information to predict regions of visibility based on the ray representations (box 350). The visual prediction module 230 then outputs this visibility prediction information (box 360).

Visual planning information can be obtained by the present invention to determine how a camera should be positioned to capture all desired views of a scene. Planning the camera path and images that the camera will capture beforehand ensures a minimum of wasted time and effort and minimizes the number of images that need to be obtained. The present invention can determine the minimum number of images needed to ensure complete visualization of an entire or portion of a scene. This information can be used to plan camera paths for scene visualizations at desired location in the scene.

The visual planning module 240 initially obtains a desired visibility region (box 370). This visibility region may be an entire or a portion of a scene. Next, a database of stored visual primitives (box 380) from the visual tunnel analyzer 220 is consulted. As discussed further below, these visual primitives (or primitive regions) are known and each has an associated camera path. The visual planning module 240 then decomposes the specified visibility region 370 into separate visual primitives (box 390) in such a way that these visual primitives minimally cover the desired visibility region 370 in ray representation space. Because each primitive region has an associated camera path, the output camera paths needed to capture the desired images (box 395) are the union of the camera paths of the selected visual primitives.

V. Visual Tunnel Ray Representation Space

The present invention can use several different techniques to represent light rays passing through each point in the image sequence. It is important to note, however, that there are several ways, known to those skilled in the art, in which ray space can be represented or whereby rays can be stored. A preferred method of representing all of the light rays in a given image sequence is to represent the light rays in a ray representation space by using a visual tunnel. A visual tunnel may be described in physical terms as follows. An image sequence taken along a camera trajectory captures a subset (or portion) of a scene appearance. Visibility space is the space that encapsulates the appearance of the scene at every conceivable pose and viewing angle, and the image sequence carves a volume in that visibility space. The volume that is carved in visibility space is referred to as a visual tunnel, and at every point in space the available rays within the visual tunnel are encoded directly. Another way to think of the visual tunnel is as a representation of all rays associated with an image sequence of a static scene.

In mathematical terms, the visual tunnel is a subset of the plenoptic function, with certain extensions. For example, each discretized location of the visual tunnel is weighted based on the density of rays in the surrounding area. Moreover, if an assumption is made that the incoming light is the same for all points along a ray, then each ray defines a line in the visual tunnel. This assumption is a valid assumption when the ray lies within free space.

Figure 4:
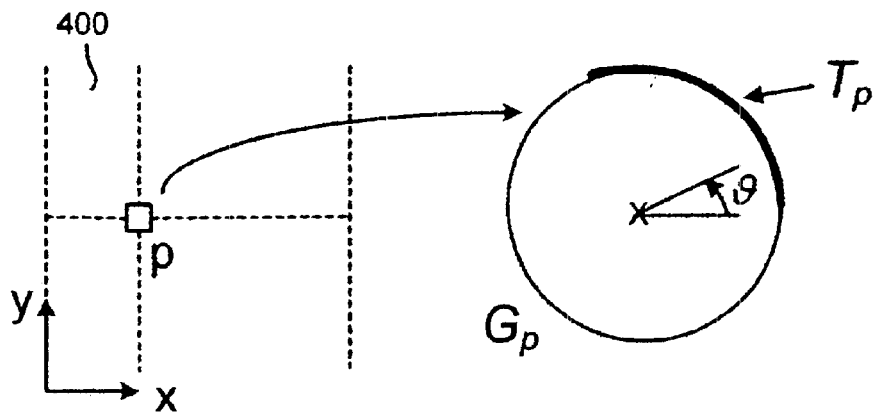
FIG. 4 is an illustration of ray representation space for a two-dimensional (linear) camera.

In a preferred embodiment, the ray representation space used by the visual tunnel analyzer 220 to represent light rays is Euclidean space plus the dimension associated with the ray direction. The visual tunnel analyzer 220 directly encodes the intersection between rays and position in space into this ray representation space. FIG. 4 is an illustration of ray representation space for a linear perspective (or two-dimensional (2D)) camera. FIG. 4 shows the concept of ray representation space within a plane 400. An assumption is made that there is a number of sampling cameras (not shown) with known poses. In other words, the location and orientation of all the rays associated with all the pixels in the cameras are known. In this ray representation space, each point p records the orientations of those rays that pass through p in the structure $G_p$. The range of orientations recorded is denoted $T_p$ in FIG. 4.

It is clear that this ray representation permits the amount of visibility available at point p to be determined very easily. In other words, the visual tunnel analysis of the present invention provides direct visual prediction information as to the distribution of available rays at any arbitrary point (such as point p).

Figure 5:
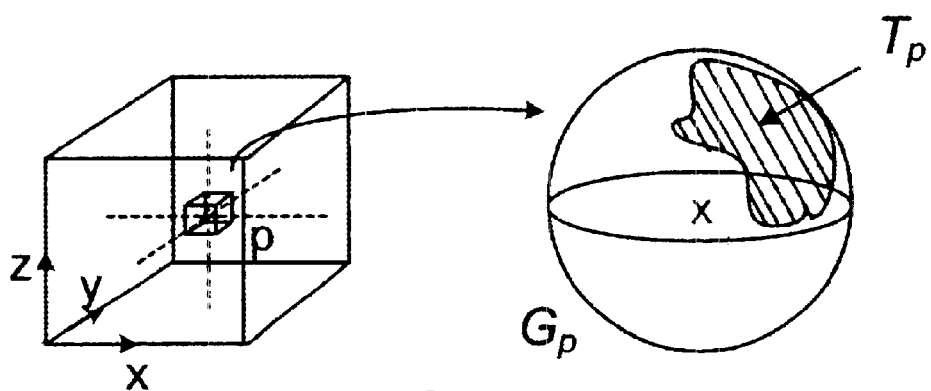
FIG. 5 is an illustration of ray representation space for a three-dimensional (regular perspective) camera.

FIG. 5 is an illustration of ray representation space for a regular perspective (or three-dimensional (3D)) camera: As shown in FIG. 5, every light ray that passes through point p in 3D space is mapped into part of a visual tunnel in ray representation space. In a preferred embodiment of FIG. 5, the ray representation space $G_p$ is a Gaussian sphere and $T_p$ represents the visual tunnel at point p. It should be noted that the visual tunnel $T_p$ resides in the plenoptic function with an additional weight factor w that represents ray density. Thus, for the 2D camera the point p may be described by $p(x,y,\partial,w)$, and for a 3D camera the point p may be described by $p(x,y,z,\partial,w)$.

Figure 6:
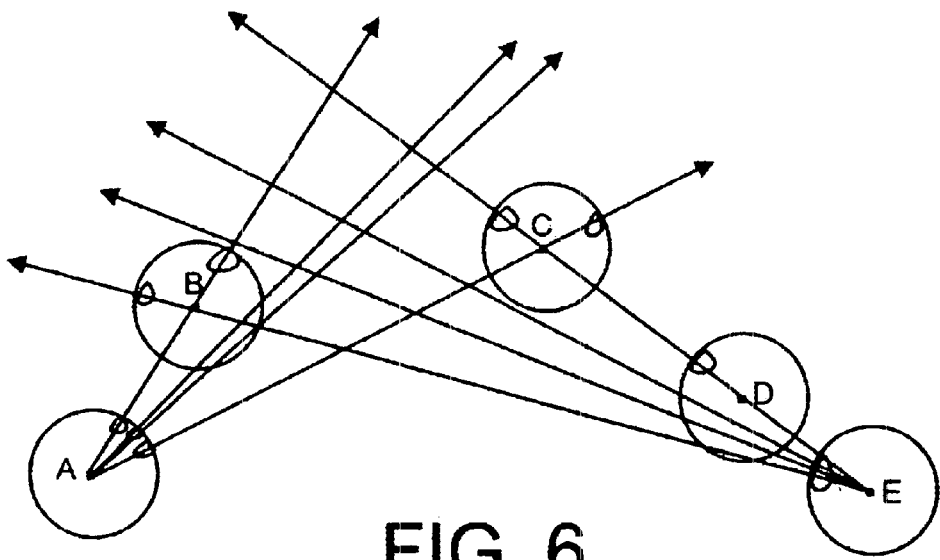
FIG. 6 is an illustration of a visual tunnel seen from different positions in an image sequence.

FIG. 6 is an illustration of a visual tunnel constructed and sampled at different positions in the 3D ray representation space. Using this visual tunnel analysis, it can be seen that all the views available for a set of captured rays in an image sequence can be determined. As shown in FIG. 6, two different sampling cameras are located at positions A and E (with four rays each), while different virtual camera locations are shown as positions B, C, and D. The resulting sampled visual tunnel (shown as shaded areas on the Gaussian spheres at these locations) indicates the amount of visibility available at that particular location.

VI. Details of Invention and Working Example

The present invention provides both visual prediction and visual planning information using a visual tunnel analysis. This working example is provided for illustrative purposes and is only one of several ways in which the present invention may be implemented.

Visual Tunnel Analysis

The working example described herein uses a visual tunnel analysis of the present invention to represent each ray in a ray representation space. Initially, the analysis is performed in 2D and then expanded to 3D. For the planar camera operating in 2D space, a direction of a ray is given by theta ($\theta$). In this working example for the 2D planar camera, the ray representation space has three dimensions $(x,y,\theta)$. $\theta$ ranges from $(-\pi)$ to $\pi$.

FIGS. 7A–7G illustrate a concentric mosaic and the density of its visual tunnel for several view angles. On the left side of FIG. 7A is the camera trajectory, which is a circle. Each tick mark around the circle indicates a camera with its associated pose and field of view. The number of camera positions is actually significantly higher than the number shown in FIG. 7A. The concentric mosaic is discussed in detail by H. Y. Shum and L. W. He in "Rendering with concentric mosaics", *Computer Graphics*, (SIGGRAPH'99), pages 7–14, October 1999, the entire contents of which are hereby incorporated by reference. When all the rays in ray representation space are plotted and the density along the η axis is computed, it is determined that the highest ray density occurs within a disk, as shown by the right side of FIG. 7A. Higher densities are illustrated by a darker area. The weight within the dark disk is actually $2\pi$, which means that a camera has a full panoramic view within the disk.

FIGS. 7B–7G show where visibility information is available and illustrate the allowable area for virtual cameras of various view angles and orientations for the concentric mosaic. Above each of FIGS. 7B–7G is an icon indicating the direction and field of view of the virtual camera. The dark regions are where the cameras are able to reconstruct views entirely from the captured rays present in the image sequence. For example, in FIG. 7B the virtual camera view is essentially a ray, while in FIG. 7E the field of view for the virtual camera is about 180 degrees. This type of visual tunnel analysis is also performed for straight and arbitrary camera trajectories.

Extending the visual tunnel analysis to 3D is done by sampling the view direction through a Gaussian sphere. The visual tunnel is essentially a subset of the plenoptic function with two important differences. First, each ray is encoded as a line in 5D space, which means that the visual tunnel is actually a 4D manifold due to the no occluder assumption. Second, each point is weighted based on local density of rays passing through its neighborhood. In this working example, the direction space is discretized by approximating the Gaussian sphere as a subdivided icosahedron, with the number of faces after the nth subdivision equal to $20 \times 4^n$. Each face represents a discretized view direction, and in this working example n is equal to 7.

Visual Prediction

Figure 8:
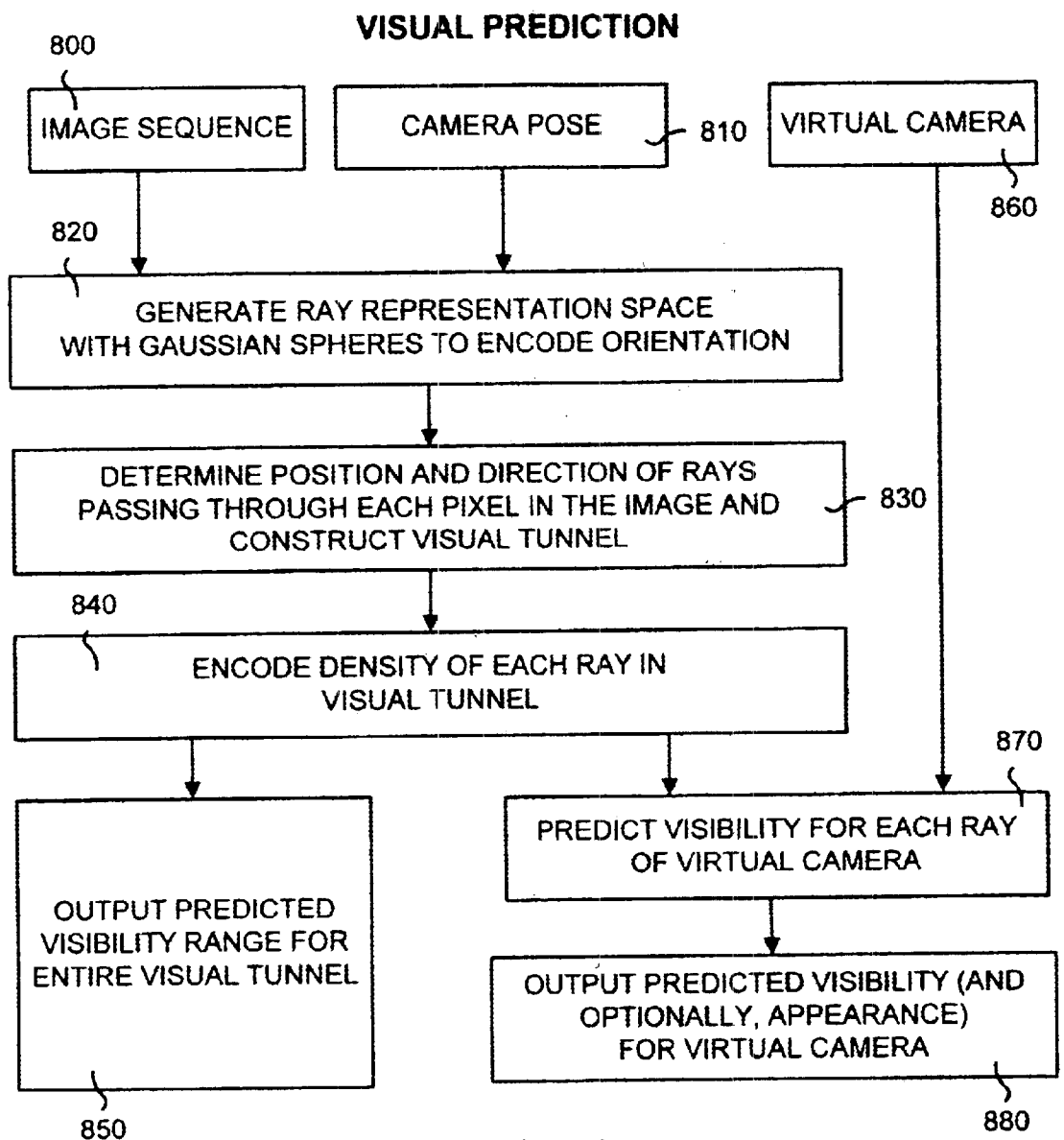
FIG. 8 is a detailed flow diagram of the operation of the present invention for obtaining visual prediction information.

FIG. 8 is a detailed flow diagram of the operation of the present invention in obtaining visual prediction information. An image sequence (box 800) and a camera pose (position and orientation) are obtained (box 810). Next, a ray representation space corresponding to a Gaussian sphere is generated (box 820). Based on the arrangement of light rays captured by the image sequence, a visual tunnel is constructed (box 830), and each ray is encoded in a visual tunnel ray representation (box 840). Once all the rays are encoded in the visual tunnel ray representation, the visibility range is computed (box 850). In the case where a specific virtual camera 860 having a known pose is given, visibility (and optionally, appearance) of the virtual camera can be predicted (box 870). This is accomplished by checking the visibility of each of ray of the given virtual camera 860. Because the visual tunnel contains color information in addition to the pose of each of the rays, both visibility and appearance can be predicted (box 880).

In this working example, regions of visibility are predicted by taking a given set of sample image sequences and converting the associated rays for each pixel within the image sequence to a visual tunnel representation. This is performed by updating the plenoptic function such that for each ray the Gaussian spheres associated with all the points in 3D space through which the ray passed records the direction of the ray. In other words, for a desired virtual camera pose the distribution of the Gaussian sphere at the virtual camera location provides the distribution of rays that are available for image synthesis. To handle the effects of the discretization of direction space in the Gaussian sphere, a radial-based weighting scheme is applied. This weighting scheme uses a perpendicular distance of a ray to the virtual camera center. In effect, the sum of the weights associated with a specific direction v for the virtual camera reflect the density of the ray captured in the image sequence within the vicinity of v.

Two image databases are used in this working example to illustrate the visual predictive capability of the present invention. The first database contains images of a truncated human head. A comparison is made between a lumigraph output and the predictions made by the present invention. The regions predicted by the visual tunnel analysis of the present invention were quite accurate, even though several different weights were used. In addition, the appearance predicted by the visual tunnel analysis of the present invention had a certain amount of graininess caused by the discretization of the Gaussian sphere. The image actually occupied a small region within the Gaussian sphere and, as a result, higher resolutions should probably be used.

Visual Planning

The present invention also includes obtaining visual planning information. Visual planning (or plenoptic authoring) is generally the inverse problem of visual prediction, and involves planning camera paths given a desired region of scene visualization.

Figure 9:
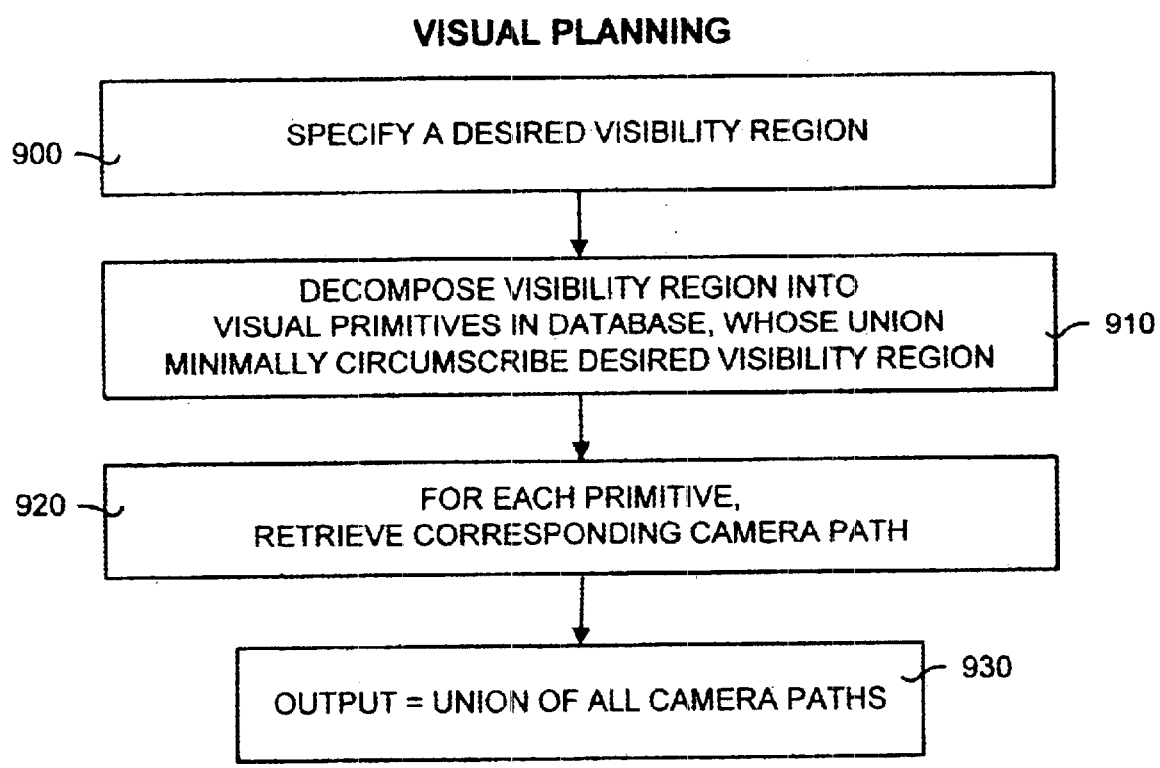
FIG. 9 is a detailed flow diagram of the operation of the present invention in obtaining visual planning information.

FIG. 9 is a detailed flow diagram of the operation of the present invention in obtaining visual planning information. In general, the present invention decomposes the problem into known visual primitives, each having known camera paths. Specifically, a visibility region is specified (box 900) and the visibility region is decomposed into a set of visual primitives that are extracted from a database in such a way as to minimally cover (or minimally circumscribe) the desired visibility region (box 910)

Figure 10:
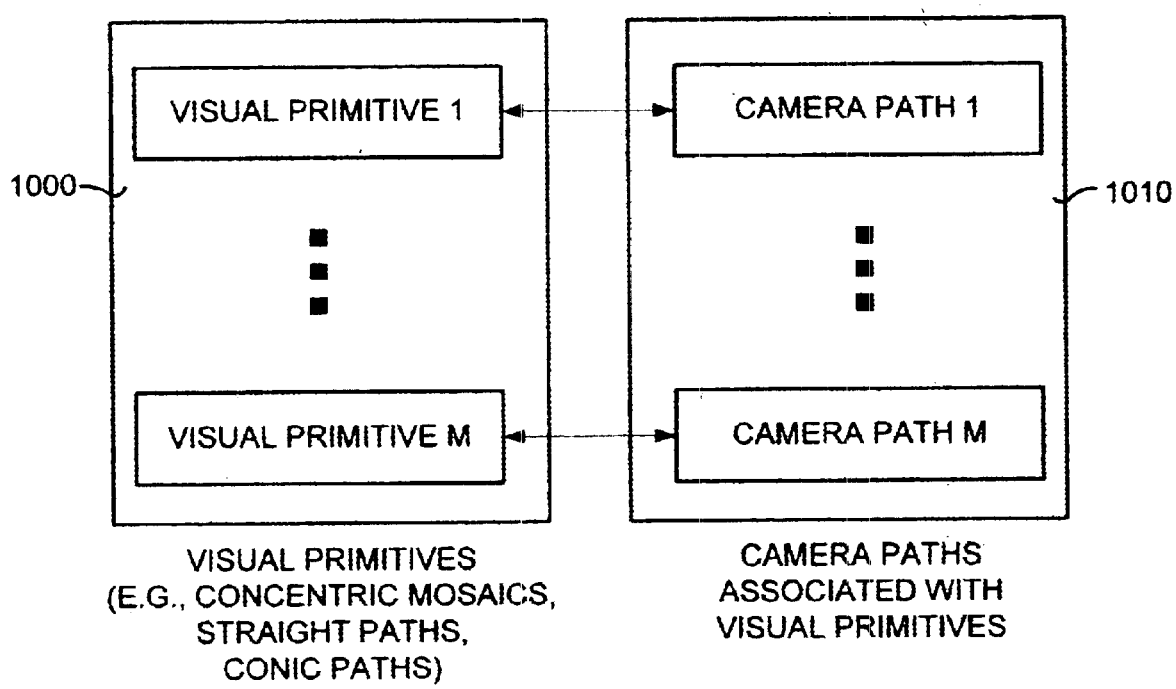
FIG. 10 illustrates the contents of the database of visual primitives and their associated camera paths.

FIG. 10 illustrates the contents of a database of visual primitives and their associated camera paths. As shown in FIG. 10, each visual primitive stored in a visual primitive database 1000 corresponds to a known camera path stored in a camera path database 1010). It should be noted that the visual primitives and the camera paths may be stored on in the same database. As illustrated in FIG. 10, visual primitive (1) has a corresponding camera path (1), visual primitive (M) has a corresponding camera path (M), and all visual primitives in between have corresponding camera paths. For each visual primitive extracted from the visual primitive database, the corresponding camera path is retrieved from the camera path database 1010 (box 920). Because each visual primitive has a known camera path, the output camera path needed to obtain these images to visualize the desired visibility region is determined as the union of each of the visual primitive camera paths (box 930).

One advantage of using the visual primitives is that specialized capture apparatuses can be used to simplify the capture of an image sequence. In this working example, for instance, a 2D camera case is considered whereby the set of visual tunnel primitives consists of concentric mosaics and straight line paths. It should be noted, however, that several other known visual primitives may be used in place of or in addition to the concentric mosaic and the straight line paths. For example, a more generalized set of known primitives may include concentric mosaics (which is a more generalized version of the concentric mosaics) and conic arcs in addition to straight paths.

Even if concentric mosaics alone are used, continuous virtual camera motion (and thus seamless change of views) is possible between different concentric mosaics that do not overlap in space. Referring again to FIGS. 7A to 7G, it can be seen that the allowable region within which a virtual camera with a given direction and view angle can move has the shape of a disk with tapered "wings" on opposite sides. The span of these wings is a function of the view angle of the virtual camera.

Figure 11:
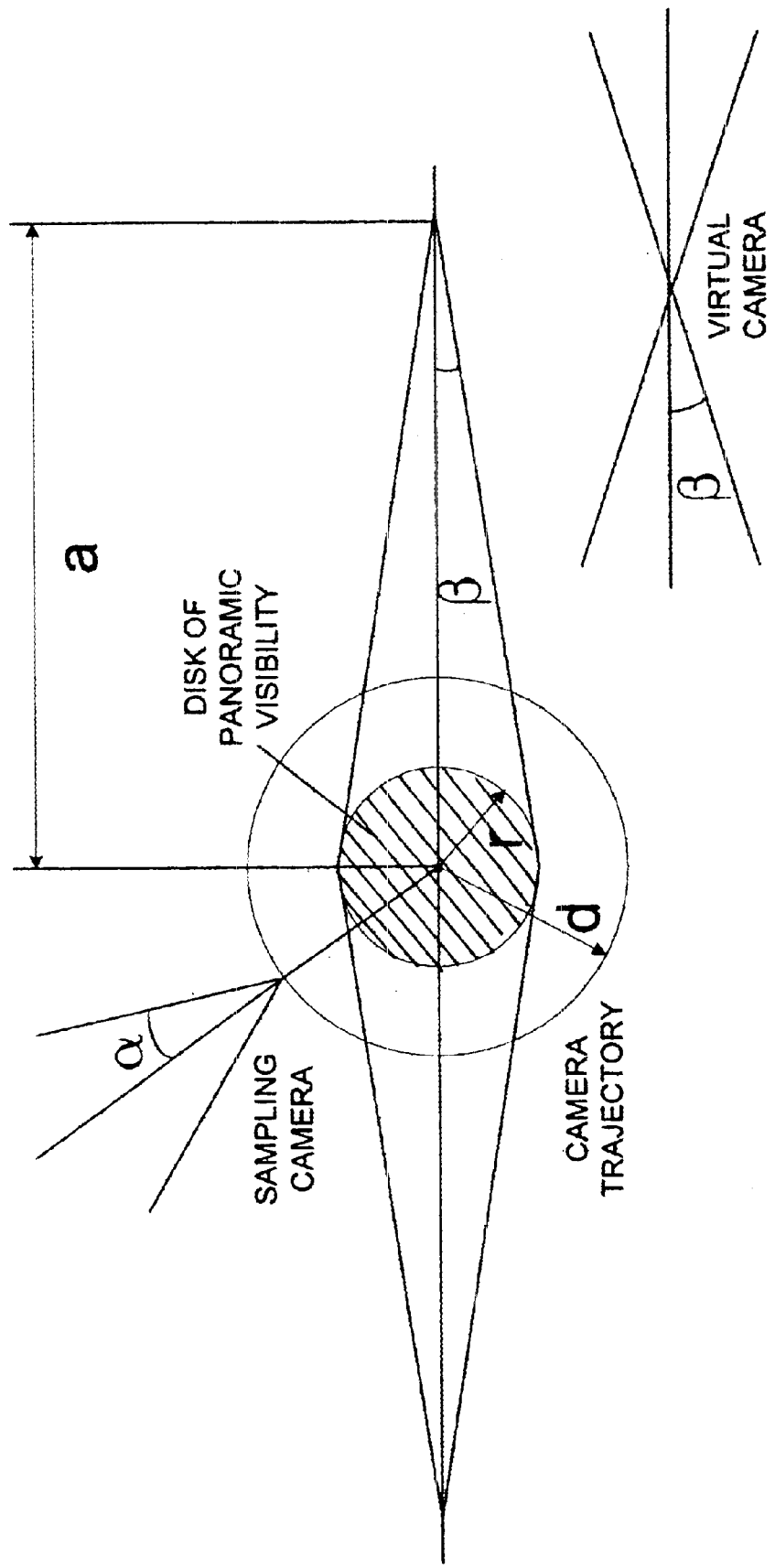
FIG. 11 illustrates the permissible virtual camera space for a concentric mosaic.

In FIG. 11 the permissible virtual camera space for a concentric mosaic is illustrated. Referring to FIG. 11, the relationship between the span of a wing can be derived as follows:

$$r = d \sin \alpha \quad (1)$$

where $\alpha$ is the half field-of-view angle of the camera.

$$\beta = \sin^{-1}(r/a) = \sin^{-1}((d/a)\sin \alpha) \quad (2)$$

or, for a given $\beta$:

$$a = (d \sin \alpha)/\sin \beta \quad (3)$$

If the only primitives are concentric mosaics and the minimum view angle of the virtual camera is known to be $\beta_{min}$, then the maximum distance between the centers of the concentric mosaics should be:

$$A_{max} = 2a_{max} = (2d \sin a)/(\sin \beta_{min}) \quad (4)$$

If the radii of the two concentric mosaics are different ($d_1$ and $d_2$, for example), then $$A_{max} = ((d_1 + d_2)\sin \alpha)/\sin \beta_{min} \quad (5)$$

Another visual primitive that may be used is a linear path (or straight line path), whereby the sampling camera is positioned looking straight ahead. The visual tunnel characteristics of the linear path primitive are known beforehand. The linear path may be used as a "bridge" between disconnected regions or islands of sampling camera paths.

FIG. 12 is a working example illustrating visual planning of the present invention. As shown in the left portion of FIG. 12, a scene containing a room 1200 has a first desired visibility region 1210 and a second desired visibility region 1220. A primitive region is constructed around the desired visibility regions 1210, 1220 using concentric mosaics. As shown on the right portion of FIG. 12, the first desired visibility region 1210 is circumscribed by a first concentric mosaic 1230 and the second desired visibility region 1220 is circumscribed by a second concentric mosaic 1240. In this working example, equation (5) is not satisfied (unless the virtual camera is allowed to have a very small field of view). Because of this, a bridging primitive is needed to connect the two visibility regions 1210, 1220. A linear path primitive 1250, which is a camera with a straight trajectory, is added to bridge the two desired visibility regions 1210, 1220. The camera on the linear path needs two passes while facing opposite directions in order to allow virtual camera motion to and from the two concentric mosaics. It should be noted that if the two desired visibility regions 1210, 1220 are close enough such that equation (5) is satisfied, then the two concentric mosaics 1230, 1240 are enough.

In a 3D camera planning situation, the concentric mosaic primitive can be extended to a "concentric spherical mosaic". Using the visual tunnel analysis of the present invention, a camera can be moved everywhere along the surface of a sphere and the spatial region within which full panoramic visualization is possible is approximately an interior ball. In fact, it is exactly a ball if the viewing frustum of the camera is exactly a cone with a circular normal cross-section. Creating a full concentric spherical mosaic, however, is not very practical. Instead, a partial concentric spherical mosaic can be constructed and is a more reasonable primitive to construct since visualization is normally done at eye level and close to horizontal orientation.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for obtaining visual information from an image sequence of scene observed by a camera, comprising:
   encoding light rays associated with the image sequence into a ray representation space;
   defining a visual tunnel by mapping the encoded light rays of the image sequence to the visual tunnel; and
   using the visual tunnel to determine the visual information about the scene.

2. The method of claim 1, wherein the visual information is one of: (a) a prediction of what regions of the scene may be visualized by the camera at any given location; (b) prediction of scene appearance at any given virtual camera location; (c) a plan as to what trajectory of the camera should be used to obtain a desired visualization of the scene.

3. The method of claim 1, wherein the defining the visual tunnel includes updating a plenoptic function.

4. The method of claim 2, further comprising extracting a region of visibility from the visual tunnel.

5. The method of claim 3, wherein updating the plenoptic function includes recording a direction and a density of light rays passing through a point on a Gaussian sphere.

6. The method of claim 2, wherein using the visual tunnel includes determining a distribution of available light rays.

7. The method of claim 1, further comprising:
   obtaining an area of interest; and
   determining a combination of visual tunnel primitives that minimally circumscribe the area of interest.

8. The method of claim 7, further comprising outputting a camera trajectory that will produce a desired visualization of the area of interest.

9. A method for determining a range of camera poses of a scene, comprising:
   specifying a desired view of the scene;
   obtaining an image sequence of the scene;
   defining a visual tunnel that includes light rays within the image sequence; and
   outputting a set of available light rays that determines the range of camera poses that will yield the desired view of the scene.

10. A method for predicting a set of available light rays in a scene by defining a visual tunnel for an image sequence that captures at least a portion of the scene, the visual tunnel being a representation of all light rays associated with the image sequence.

11. A method for determining visual information from a collection of light rays, comprising:
    determining an orientation and direction of each light ray within the collection of light rays;.
    generating ray representations by mapping each light ray to a ray representation space;
    defining a visual tunnel in ray representation space that contains the ray representations; and
    predicting available views using the ray representations.

12. The method of claim 11, wherein the collection of light rays is at least one of: (a) an image sequence; (b) a virtual camera having a known location.

13. The method of claim 11, wherein the visual information is at least one of: (a) available views of a scene represented by the light rays; appearance of a scene represented by the light rays.

14. The method of claim 11, wherein generating ray representations further comprises encoding the orientation and direction of each light ray in a visual tunnel ray representation.

15. The method of claim 14, wherein encoding further comprises using a Gaussian sphere to determine which of the light rays are available for synthesis of the available views.

16. The method of claim 14, wherein generating ray representations further comprises encoding the density of the light rays in a visual tunnel ray representation.

17. A method for planning a camera path that will provide visualization of a desired visibility region, comprising:
 providing a set of known visual primitives, with each known visual primitive having a corresponding camera path;
 decomposing the desired visibility region into known visual primitives; and
 determining the camera path based on the decomposition.

18. The method of claim 17, wherein decomposing the desired visibility region is performed such that a union of the known visual primitives used in the decomposition minimally circumscribes the desired visibility region.

19. The method of claim 17, wherein the set of known visual primitives includes at least one of: (a) concentric mosaics; (b) conic arcs; (c) straight paths.

20. The method of claim 17, wherein determining the camera path includes determining a union of each camera path corresponding to the known visual primitives used in the decomposition.

21. A method for processing an image sequence containing at least a portion of a scene along a camera trajectory, comprising:
 defining a visibility space as a space that encapsulates the appearance of the scene in the image sequence at every conceivable camera pose and viewing angle;
 defining a visual tunnel as a volume that is carved in the visibility space; and
 encoding at every point in the visibility space available rays within the visual tunnel; and
 obtaining visual prediction information from the encoded rays.

22. The method of claim 21, wherein the visual tunnel is represented by at least of portion of a Gaussian sphere.

23. A method for planning a camera trajectory to capture a desired visualization of a scene, comprising:
 providing visual tunnel primitives, each of the visual tunnel primitives having an associated camera path;
 determining a combination of the visual tunnel primitives that will minimally circumscribe the desired visualization of the scene; and
 determining a camera trajectory from the combination of visual tunnel primitives such that the camera trajectory is a union of the camera paths associated with the combination of visual tunnel primitives and such that the camera trajectory will provide the desired visualization of the scene.

24. The method of claim 22, wherein the visual tunnel primitives include at least one of: (a) concentric mosaics; (b) straight line paths.

\* \* \* \* \*

UNITED STATES PATENT AND TRADEMARK OFFICE
CERTIFICATE OF CORRECTION

PATENT NO.    : 6,642,924 B1
DATED         : November 4, 2003
INVENTOR(S)   : Kang et al.

It is certified that error appears in the above-identified patent and that said Letters Patent is hereby corrected as shown below:

Column 10,
Lines 22-23, "$p(x,y,\partial,w)$" should be changed to -- $p(x,y,\vartheta,w)$ --

Line 24, "$p(x,y,\partial,w)$" should be changed to -- $p(x,y,\vartheta,w)$ --

Line 65, "η" should be changed to -- θ --

Column 11,
Line 26, "$20\text{x}4^{\Pi}$" should be changed to -- $20\text{x}4^n$ --

Signed and Sealed this

Thirteenth Day of April, 2004

JON W. DUDAS
*Acting Director of the United States Patent and Trademark Office*